United States Patent [19]

Makowski

[11] Patent Number: 5,712,849
[45] Date of Patent: Jan. 27, 1998

[54] INFORMATION TRANSMISSION SYSTEM COMPRISING AT LEAST A BASE STATION AND A SATELLITE STATION, AND STATION FORMING PART OF SUCH A SYSTEM

[75] Inventor: Pierre Makowski, Prunay, France

[73] Assignee: U.S. Philips Corporation, New York, N.Y.

[21] Appl. No.: 573,909

[22] Filed: Dec. 18, 1995

Related U.S. Application Data

[63] Continuation of Ser. No. 402,766, Mar. 13, 1995, abandoned, which is a continuation of Ser. No. 105,818, Aug. 11, 1993, abandoned.

[30] Foreign Application Priority Data

Aug. 14, 1992 [FR] France ............................ 92 10037

[51] Int. Cl.$^6$ ............................................ H04J 3/16
[52] U.S. Cl. ........................ 370/310; 370/498; 375/312; 455/33.1
[58] Field of Search ........................ 370/68, 77, 95.1, 370/95.3, 112, 376, 498, 539, 310, 311; 375/60, 309, 310, 311, 312; 455/127, 116

[56] References Cited

U.S. PATENT DOCUMENTS

| | | | |
|---|---|---|---|
| 4,941,141 | 7/1990 | Hayano | 370/68 |
| 5,020,056 | 5/1991 | Chennakeshu | 370/95.3 |
| 5,128,629 | 7/1992 | Trinh | 455/127 |
| 5,175,870 | 12/1992 | Mabey et al. | 370/95.3 |
| 5,196,806 | 3/1993 | Ichihara | 375/312 |
| 5,231,635 | 7/1993 | Travers et al. | 370/95.1 |
| 5,251,217 | 10/1993 | Travers et al. | 370/112 |
| 5,260,973 | 11/1993 | Watanabe | 375/309 |
| 5,278,835 | 1/1994 | Ito et al. | 370/95.3 |
| 5,426,641 | 6/1995 | Afrashteh et al. | 455/116 |
| 5,475,684 | 12/1995 | Shimizu | 375/309 |
| 5,485,486 | 1/1996 | Gilhousen et al. | 455/33.1 |
| 5,509,015 | 4/1996 | Tiedemann, Jr. et al. | 370/95.3 |

OTHER PUBLICATIONS

"Amplifier Linearization Using a Digital Predistorter With Fast Adaption and Low Memory Requirements" Dr. Cavers, IEEE VT, Nov. 1990.

*Primary Examiner*—Douglas W. Olms
*Assistant Examiner*—Shick Hom
*Attorney, Agent, or Firm*—Brian J. Wieghaus

[57] ABSTRACT

An information transmission system includes a base station with a base transmitter and a plurality of satellite stations. Each satellite station includes a satellite receiver for receiving a transmission from the base station and a satellite transmitter including a transmitter amplifier, the transmitter amplifier requiring a preparation period of time to prepare the transmitter amplifier for operation. The transmission of information between and satellite station and the base station occurs during a transmission portion of a selected time slot within a succession of time slots. The amplifier in each of the satellite stations is prepared for transmission during a preparation portion of a same time slot having a duration at least equal to the preparation period for the satellite station transmitters and occurring prior to the transmission portion of the selected time slot. In another embodiment, information is transmitted from the base station during the selected time slot to a plurality of the satellite stations. The transmitters of each satellite station are prepared during a time slot prior to the selected time slot or are partially prepared both during a prior time slot and during the selected time slot, prior to the transmission in each time slot.

8 Claims, 2 Drawing Sheets

INFORMATION TRANSMISSION SYSTEM COMPRISING AT LEAST A BASE STATION AND A SATELLITE STATION, AND STATION FORMING PART OF SUCH A SYSTEM

This is a continuation of application Ser. No. 08/402,766, filed Mar. 13, 1995, now abandoned which is a continuation of application Ser. No. 08/105,818 filed Aug. 11, 1993, now abandoned.

BACKGROUND OF THE INVENTION

The invention relates to an information transmission system comprising at least a base station and a satellite station, in which system the exchange of information between the base station and the satellite station is affected for one direction at least by means of time slots, in which a time slot is at least assigned to a first transmission and in which each satellite station comprises a transmitter amplifier requiring a period of time to prepare it for operation.

Such systems are widely used in the field of radio communication for stations arranged on mobile vehicles. These systems may be intended for utilizing time slots organized in time-division multiplex of the TDMA type (time-division multiplex access).

A problem presents itself in this type of system when a station is to transmit in a time slot after a given period of inactivity. The transmitter amplifier which inevitably comprises the transmitter section of the transmitter station and which is most frequently a linear power amplifier is then to be prepared for operation. This preparation, preferably on a pure carrier or with an appropriate sequence of bits, is necessary in order that the amplifier should be linear and the future transmissions should occupy the spectrum allocated to them. This takes a lapse of time which may be considerable with respect to the duration of the multiplex time slot so that the overall efficiency of the multiplex is affected.

It is to be noted that this aspect of preparing the linear amplifiers for operation is described in the article "Amplifier Linearization Using a Digital Predistorter with Fast Adaptation and Low Memory Requirements" by Dr. Cavers, IEEE VT, November 1990.

SUMMARY OF THE INVENTION

It is an object of the invention to provide a system of the type described in the opening paragraph which mitigates the afore-described drawback to a considerable extent and thus provides the possibility of a better exploitation of the time-division frame used.

To this end such a system is characterized in that said first transmission time slot may be assigned to a plurality of satellite stations.

The invention also relates to the stations forming part of said system.

BRIEF DESCRIPTION OF THE DRAWINGS

These and other aspects of the invention will be apparent from and elucidated with reference to the embodiments described hereinafter.

In the drawings

DETAILED DESCRIPTION OF THE PREFERRED EMBODIMENTS

Figure 1:
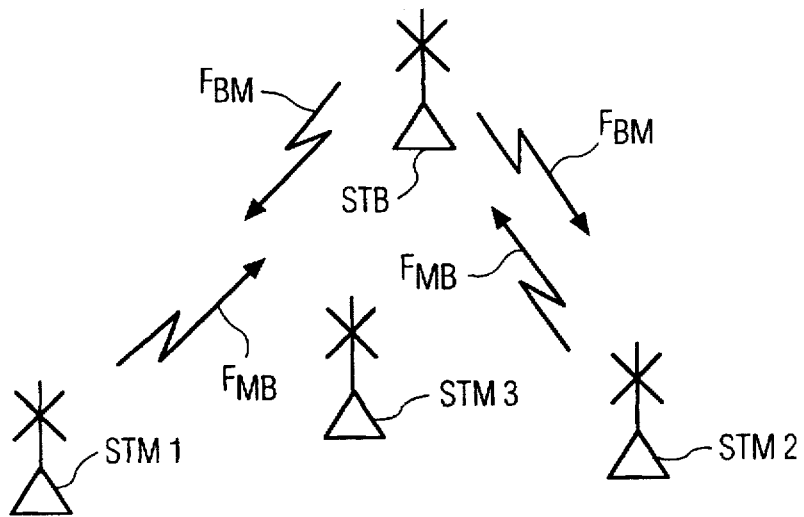
FIG. 1 shows a system according to the invention.

The system shown in FIG. 1 comprises an assembly of transmitter-receiver stations STB, STM1, STM2 and STM3.

It will be evident that the number of stations may be arbitrary. STB is a base station, STM1, STM2 and STM3 are satellite stations, i.e. they are managed from the base station STB. Normally, the base station is a fixed station while the stations STM1, STM2 and STM3 are portable stations or stations arranged on vehicles. The stations communicate with each other by radioelectric connections using two carriers $F_{BM}$ and $F_{MB}$ (which may be identical). Generally, the carrier $F_{MB}$ is used for the connections between the satellite stations and the base station, while the carrier $F_{BM}$ is used for connections between the base station and the satellite stations. These different connections are organized in time-division multiplex of the TDMA type transmitted by the afore-mentioned carriers, but the method described is also applicable to FDMA connections using Aloha or equivalent access frames.

Figure 2A:
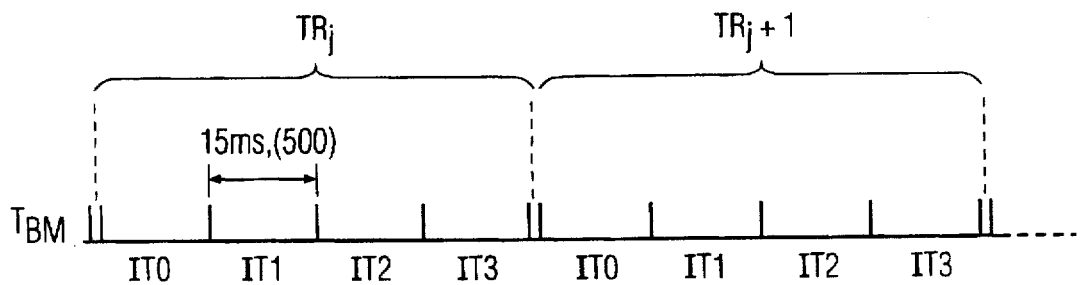
FIG. 2 shows the organization of the TDMA frames used.
Figure 2B:
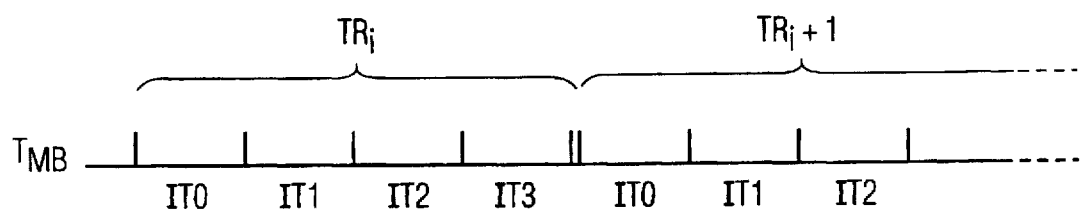
Figure 3A:
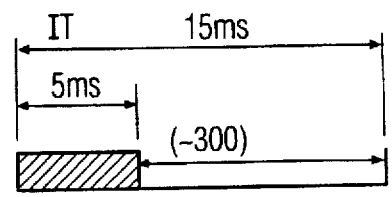
FIG. 3 shows different ways of inserting the time to prepare for operation into previous time slots and/or first transmission time slots.
Figure 3B:
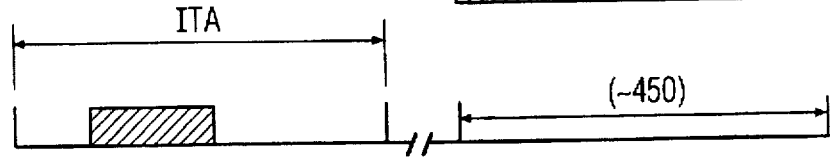
Figure 3C:
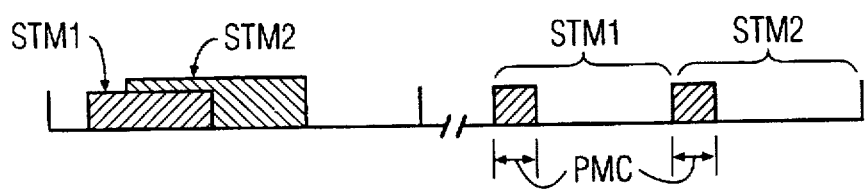
Figure 3D:
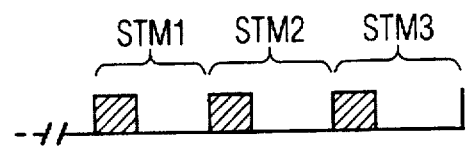
Figure 3E:

FIG. 2 shows diagrammatically this multiplex organization. This organization is derived from that described in French Patent Application no. 2 667 748. The $T_{BM}$ and $T_{MB}$ multiplexes using the carriers $F_{BM}$ and $F_{MB}$, respectively, have the same structure, but there is, a priori, no temporal relation between them. The $T_{BM}$ and $T_{MB}$ multiplexes are constituted by a sequence of frames $TR_j$, $TR_{j+1}$ and $TR_i$ and $TR_{i+1}$, respectively. Each frame is constituted by time slots IT0, IT1, IT2 and IT3. In practice these time slots have a duration of the order of 15 ms which is sufficient for transmitting 450 bits. A time slot is often assigned to a first transmission.

FIG. 3, line a, shows a first transmission time slot IT where the shaded zone shows the time to prepare the amplifier for operation, which time takes 5 ms in practice. Thus, a time for transmitting 300 bits is left.

In accordance with a first aspect of the invention a particular previous time slot ITA may be reserved (in a fixed manner or arbitrarily the base station) for the time to prepare all satellite stations for operation, which stations have to use a first transmission time interval. Thus, as the time to prepare for operation is outside said slot and with reference to line b of FIG. 3, almost the whole time slot IT may be used for transmitting bits: thus 450 bits instead of 300 may be transmitted in the previous example, i.e. a gain of 50% in this case. It will be evident that the intervals ITA and IT shown at b in FIG. 3 are not necessarily contiguous and that the time to prepare for operation may be longer and cover the whole time interval. With the gain thus realised each time slot may be subdivided into sub-multiples as a function of the number of bits which are effectively necessary for transmission in each interval.

A second aspect of the invention is illustrated at c in FIG. 3 in which each time slot may be shared by two satellite stations; the time to prepare for operation is associated with the same time interval ITA which is not necessarily adjacent to the time slot IT under consideration. It is to be noted that a more or less long period PMC to prepare for operation again may be reserved independently for each satellite station, enabling them to improve this preparation of their transmitter, if necessary (for example, if the time interval ITA used to prepare for operation is too far away from the interval IT in which the useful information is transmitted).

The line d in FIG. 3 shows a section of the slot IT which can be used for 3 satellite stations.

In accordance with a preferred aspect of the invention illustrated at line e in FIG. 3, a part of only the first transmission time slot is assigned to prepare the transmitters of the satellite stations having to use the same first transmission time slot IT.

With reference to line e of FIG. 3 the two satellite stations STM1 and STM2 use the first part (shaded) of the first transmission time slot for simultaneously preparing them for operation and subsequently each station uses one of the two halves of the remaining part of said slot for transmitting their useful bits.

The effectiveness of the rising frame $T_{MB}$ may be doubled by the measures according to the invention, for example, for the random-access frames. As described hereinbefore, and as a function of the required bits to be transferred by the satellite stations and the time to be reserved for preparing for operation, each time slot IT may be allocated to a larger number of satellite stations.

Figure 4:
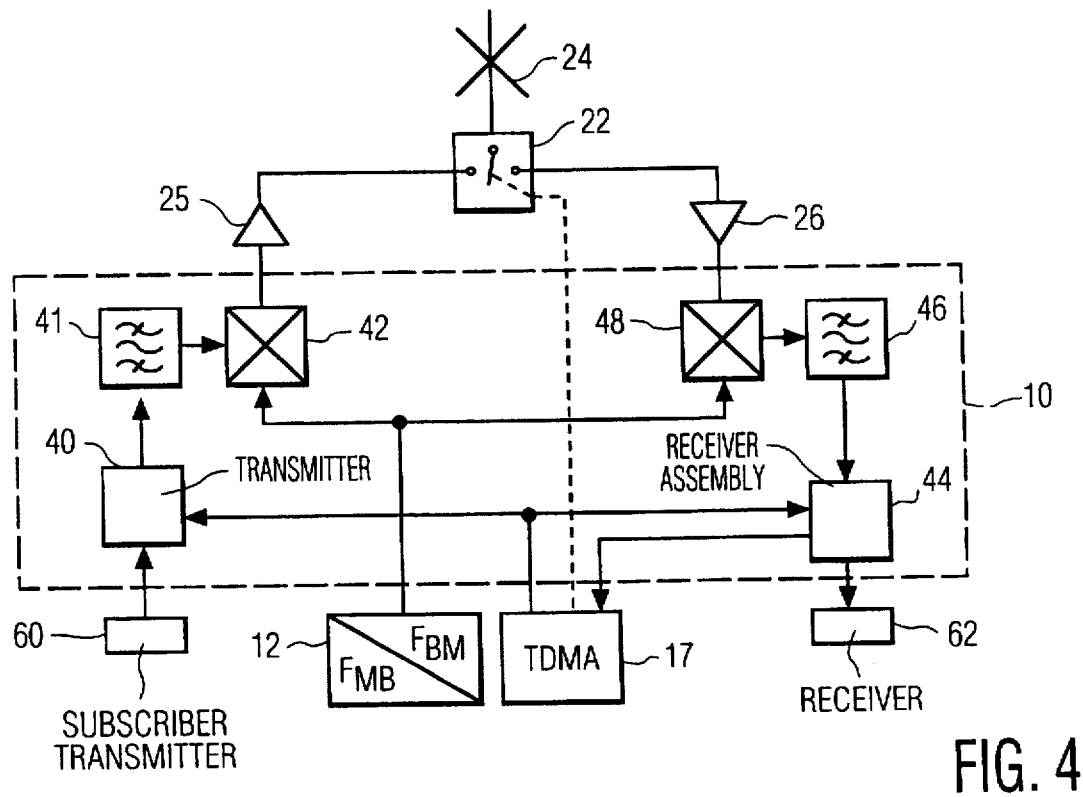
FIG. 4 shows the diagram of a satellite station.

FIG. 4 shows the diagram of a satellite station. The station comprises a transmitter-receiver assembly 10 controlled by a couple of oscillators 12 oscillating at the frequencies $F_{MB}$ and $F_{BM}$, respectively. This assembly is adapted to a frame TDMA by means of a frame control unit 17. A duplexing switch 22 controlled by the control unit 17 provides the possibility of transmitting at the frequency $F_{MB}$ and receiving at the frequency $F_{BM}$ via one and the same antenna 24. A transmitter amplifier 25 and a receiver amplifier 26 are connected to this switch 22. It is the amplifier 25 which requires the time to prepare it for operation in order that its linearity is suitable. The non-linearities are thus prevented from polluting the frequency spectrum.

The assembly 10 is constituted by a transmitter section 40 cooperating with a filter 41, centred at an intermediate frequency FI, and a modulator 42. The modulator 42 centres the information furnished by the section 40 at the carrier frequency $F_{MB}$. The section 40 arranges the information to be transmitted in accordance with the commands given by the control unit 17 and modulates the information in phase, frequency or amplitude on an intermediate frequency FI. This control unit 17 also provides the possibility of retrieving the different information components contained in the frame TDMA and received by a receiver assembly 44. The input of this assembly is connected to the output of a filter 46 which is centred at the frequency FI and connected to the output of a demodulator 48. This demodulator 48 receives the signals from the amplifier 26 and those provided by the oscillators 12 for receiving the signals at the frequency $F_{BM}$. The reference numeral 60 denotes the subscriber's transmitter which is connected to the transmitter section 40 and the reference numeral 62 denotes the receiver which is connected to the receiver assembly 44.

I claim:

1. An information transmission system, comprising:
    a base station including a base transmitter;
    a plurality of satellite stations, each satellite station including (i) a satellite receiver for receiving a transmission from said base station, and (ii) a satellite transmitter including a transmitter amplifier, said transmitter amplifier requiring a preparation time period to prepare said amplifier for operation;
    means for allocating the transmission of information from said satellite stations to said base station within a time frame including a plural succession of time slots;
    means for starting the transmission of information between a said satellite station and said base station during a transmission portion of a selected time slot; and
    means for preparing said amplifier in each of a plurality of said satellite stations during a preparation portion of a same time slot occurring prior to said selected time slot, said preparation portion having a duration at least equal to said preparation time period for said transmitter amplifiers.

2. An information transmission system according to claim 1, wherein:
    said means for starting the transmission of information transmits information, within said selected time slot, between a plurality of said satellite stations and said base station, the transmission portion including allocation parts each allocated within said selected time slot to a respective one of said plurality of satellite stations; and
    said means for preparing prepares said amplifier in each of said plurality of satellite stations with a first part of said preparation portion occurring in a time slot prior to said selected time slot and with a second part of said preparation portion occurring during said selected time slot, said second part of said preparation portion including allocation parts each allocated to a respective one of said plurality of satellite stations, each allocation part of said second part occurring within said selected time slot prior to the corresponding allocation part of said transmission portion, and said allocation parts of said second part of said preparation portion each having a duration shorter than said preparation time period.

3. An information transmission system, comprising:
    a base station including a base transmitter;
    a plurality of satellite stations, each satellite station including (i) a satellite receiver for receiving a transmission from said base station, (ii) a satellite transmitter including a transmitter amplifier, said transmitter amplifier requiring a preparation time period to prepare said amplifier for operation;
    means for allocating the transmission of information from said satellite stations to said base station within a time frame including a plural succession of time slots;
    means for starting the transmission of information between a said satellite station and said base station during a transmission portion of a selected time slot; and
    means for preparing said amplifier in each of a plurality of said satellite stations during a preparation portion of said selected time slot, said preparation portion having (i) a duration at least equal to said preparation time period for said transmitter amplifiers and (ii) occurring prior to said transmission portion of said selected time slot and within said selected time slot.

4. An information transmission system according to claim 3, wherein:
    said means for starting the transmission of information transmits information, within a single selected time slot, between a plurality of said satellite stations and said base station, the transmission portion including successive allocation parts each allocated within said selected time slot to a respective one of said plurality of satellite stations, said allocation parts occurring in direct time succession; and
    said means for preparing prepares said amplifier in each of said plurality of satellite stations during a said preparation portion within said selected time slot occurring prior to said successive allocation parts.

5. A first satellite station for an information transmission system, the information transmission system including a base station and a plurality of satellite stations which plurality includes said first satellite station, the satellite stations and the base station transmitting information within a time frame having a succession of time slots, each satellite station transmitting information within a selected corresponding time slot within the time frame, said first satellite station comprising:

a satellite transmitter including a transmitter amplifier, said transmitter amplifier requiring a preparation time period to prepare said amplifier for operation;

means for starting the transmission of information to the base station during a transmission portion of a single respective selected time slot for said first satellite station; and means for preparing said amplifier during a preparation portion of a time slot occurring prior to said selected time slot, said preparation portion having (i) a duration at least equal to said preparation period for said transmitter amplifier and (ii) occurring within the same time slot as the preparation portion of at least one other of said satellite stations of the system.

6. A first satellite station according to claim 5, wherein:

said means for starting the transmission of information transmits information, within a single selected time slot, between said first satellite station and said base station, the transmission portion including allocation parts each allocated within said selected time slot to a respective one of said plurality of satellite stations; and said means for preparing prepares said amplifier in said plurality of first satellite station with a first part of said preparation portion occurring in a time slot prior to said selected time slot and with a second part of said preparation portion occurring during said selected time slot, said second part of said preparation portion including allocation parts each allocated to a respective one of said plurality of satellite stations, each allocation part of said second part occurring within said selected time slot prior to the corresponding allocation part of said transmission portion, and said allocation parts of said second part of said preparation portion each having a duration shorter than said preparation period.

7. A first satellite station for an information transmission system, the information transmission system including a base station and a plurality of satellite stations which plurality includes said first satellite station, the satellite stations and the base station transmitting information within a time frame having a succession of time slots, each satellite station transmitting information within a selected corresponding time slot within the frame, said first satellite station comprising:

a satellite transmitter including a transmitter amplifier, said transmitter amplifier requiring a preparation time period to prepare said amplifier for operation;

means for starting the transmission of information between a said first satellite station and said base station during a transmission portion of a selected time slot; and means for preparing said amplifier during a preparation portion of said selected time slot, said preparation portion having (i) a duration at least equal to said preparation time period for said satellite transmitter and (ii) occurring prior to said transmission portion of said selected time slot, within said selected time slot and concurrently with the preparation portion of at least one other satellite station within said system.

8. A first satellite station according to claim 7, wherein:

said means for starting the transmission of information transmits information, within a single selected time slot, along with at least one other satellite station within the system, the transmission portion for said satellite station including an allocation part allocated within said selected time slot along with an allocation part for said at least one other satellite station, said allocation parts being successive allocation parts occurring in direct time succession; and said means for preparing prepares said amplifier during a said preparation portion within said selected time slot occurring prior to said successive allocation parts.

* * * * *